June 1, 1926.

E. A. ORMSBY

METER

Filed Feb. 27, 1925

1,586,834

2 Sheets-Sheet 1

Elva A. Ormsby
INVENTOR

BY Edgar P. Gaddis
ATTORNEY

June 1, 1926.

E. A. ORMSBY

METER

Filed Feb. 27, 1925

1,586,834

2 Sheets-Sheet 2

INVENTOR
Elon A. Ormsby
BY Edgar S. Gaddis
ATTORNEY

Patented June 1, 1926.

1,586,834

UNITED STATES PATENT OFFICE.

ELON A. ORMSBY, OF CENTERVILLE, CALIFORNIA, ASSIGNOR TO AUGUSTA N. ORMSBY, OF CENTERVILLE, CALIFORNIA.

METER.

Application filed February 27, 1925. Serial No. 12,021.

This invention relates to meters or measuring devices of that type in which a floating piston is operated by the material being delivered by a pump or the like, the reciprocation of the piston acting to operate a registering device whereby the amount of the material delivered is measured and indicated. The device will be found particularly useful for measuring grease, oil and similar liquids, such for example as are dispensed at automobile filling stations.

The object of the invention is to provide an improved device of the type indicated, the particular improvement residing in the structure of the apparatus and with respect to the operation of the valves which control the inlet to and outlet from opposite ends of the cylinder in which the piston reciprocates, this control being such that a continuous delivery is possible, the grease or other material being supplied into one end of the cylinder and being discharged at the opposite end, the operation being automatically reversed so that the inlet and outlet are alternately at opposite ends. Various other improvements will be apparent from the description and drawings.

Figure 1:
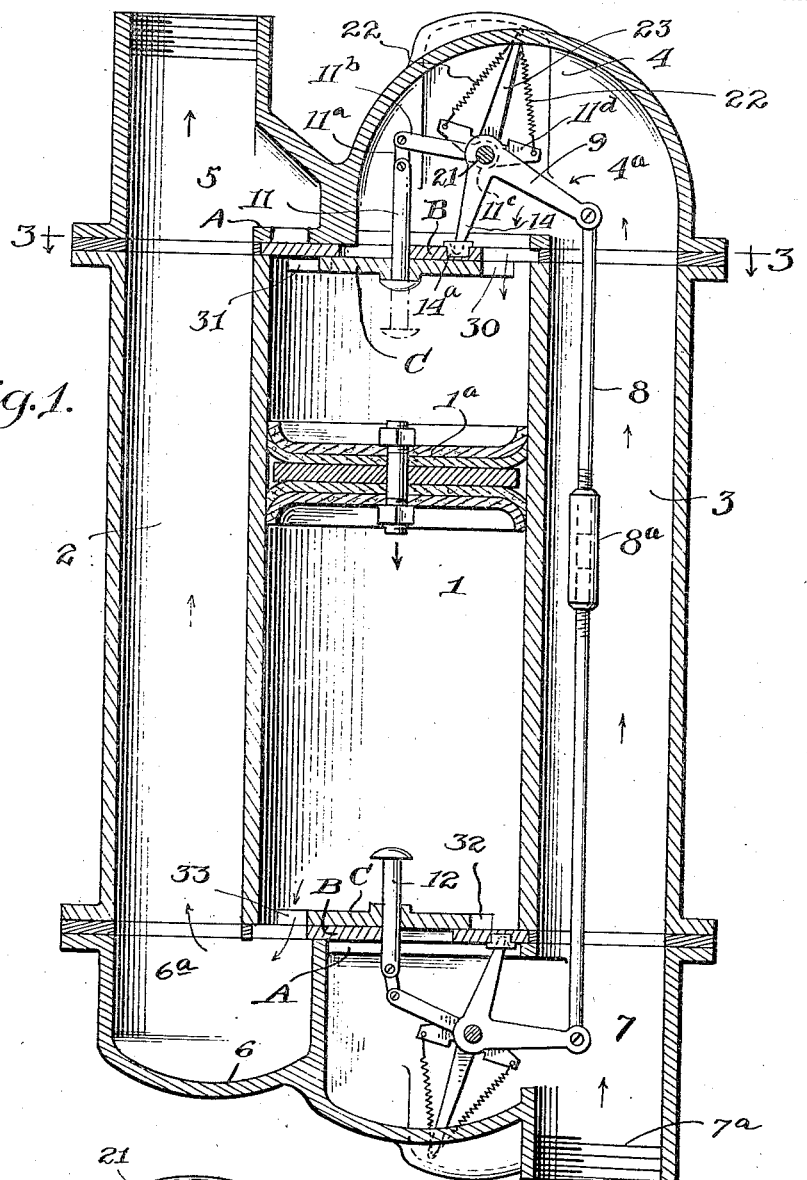
Figure 6:
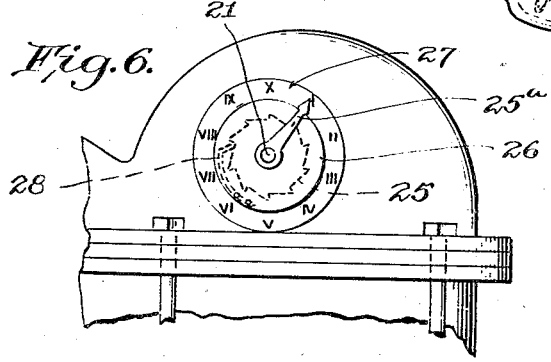
Figure 3:
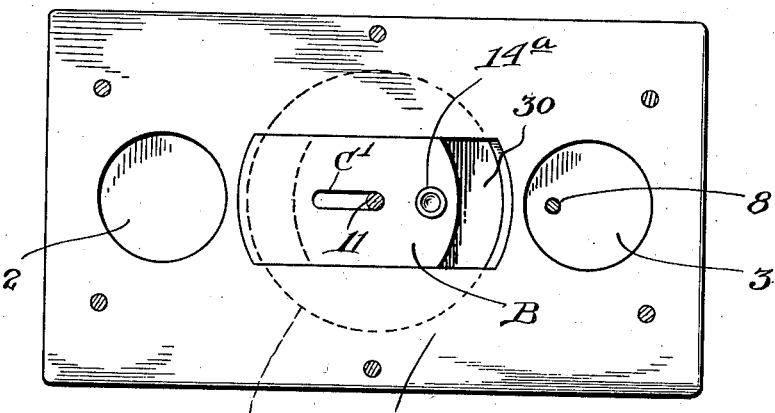
Figure 2:
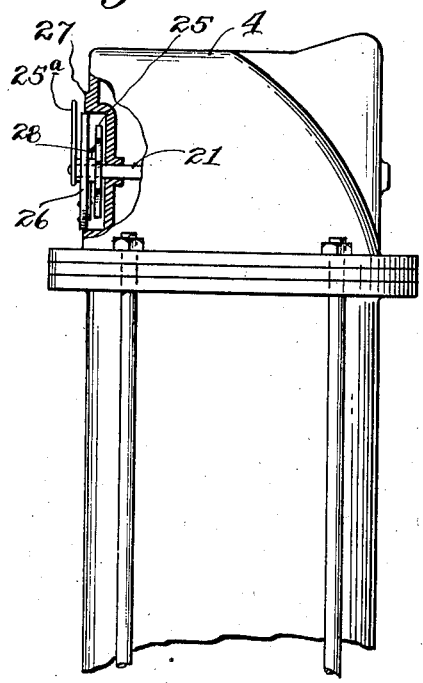
Figure 4:
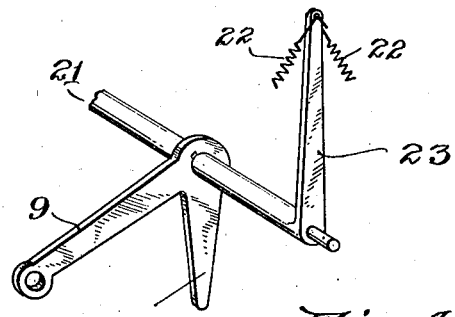
Figure 5:
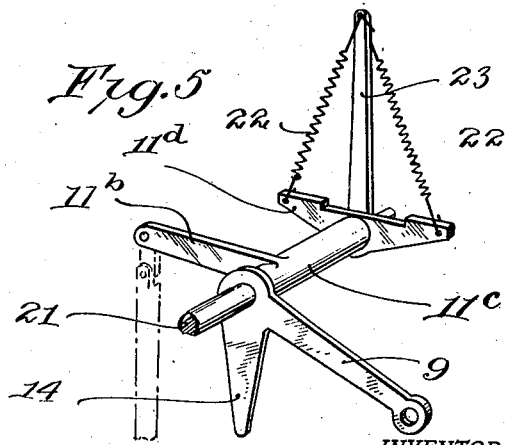

In the drawings, Fig. 1 is a longitudinal section of the meter. Fig. 2 is a side elevation. Fig. 3 is a section on the line 3—3 of Fig. 1. Figs. 4 and 5 are details in perspective of one of the valve operating devices. Fig. 6 is a face view showing the register.

In the drawing, 1 indicates a main cylinder of predetermined capacity, say a quart. In this is a floating piston $1^a$ which is operated by the pressure of the fluid on one side or the other. Standing beside this cylinder are two other cylinders 2 and 3. Fitted to one end of these cylinders is a head 4 having an outlet passage 5, and fitted to the other end of the cylinders is a head 6 having an inlet passage 7. The head 4 is chambered as indicated at $4^a$, and this chamber $4^a$ communicates with the tube or cylinder 3 which tube also communicates at its other end with the chamber 7 in the opposite end, said chamber having an inlet at $7^a$ to which the fluid to be measured and delivered may be supplied from any pump, tank or the like, under pressure. The outlet passage 5 in the upper head communicates with the upper end of tube 2 and the lower end of the latter communicates with a passage $6^a$ in the lower head. In the operation of the device, these chambers $4^a$, 5, $6^a$ and 7, and the tubes 2 and 3, will ordinarily be full of the grease or other material.

The joints between the ends of the cylinders and the heads above referred to comprise a pair of spaced plates A and C, between each pair of which slides a plate valve B. The plates have openings at 30 between the chamber $4^a$ and the adjacent end of the cylinder 1, and between the same end of the cylinder and the outlet 5, and at the other end the plates have openings 32 between the chamber 7 and the cylinder 1 and openings 33 between the same end of the cylinder and the chamber $6^a$. These openings are controlled by the valves B. When the upper valve, for example, is slid one way, it opens the ports 30 and closes the ports 31, and vice versa; and a similar movement of the valve at the other end opens and closes the ports 32 and 33, the arrangement being such that the ports 30 and 33 are opened and closed at the same time, and similarly with respect to the ports 31 and 32, so that when liquid is entering the cylinder 1 at one end it is discharging from the other end of the cylinder. The valves move simultaneously, in opposite directions, and this movement is accomplished by the piston $1^a$ striking one or the other of a pair of strike pins 11 and 12 working thru the plates at the opposite ends of the cylinder, the valve plates B being slotted as indicated at C where the pins pass thru. The pin 11 has a jointed connection $11^a$ to an arm $11^b$ projecting from a sleeve $11^c$ which is provided at one end with a rocker $11^d$ extending crosswise and connected at opposite ends by springs 22 to a crank arm 23 projecting from a rock shaft 21 which is mounted in bearings in the head 4 and extends thru the wall thereof, the sleeve $11^c$ being loose on the rocker shaft 21. This rock shaft has fixed thereto a bell crank lever 9, one arm 14 of which engages in a socket piece $14^a$ carried by the valve plate B. The other end of the bell crank lever 9 is connected to a rod 8 which extends thru the tube 3 to the opposite end of the meter. This rod is made in sections connected by a turn buckle $8^a$ so that it may be adjusted for length, and at its opposite end it is connected to a bell crank lever and other parts similar to the valve shifting devices above described, said devices including the striker pin 12 above referred to.

As stated, and as will be apparent from the drawings, the valves act oppositely. Assuming that the upper valve is shifted to open the port 30 and close the port 31, the lower valve will be shifted to close the port 32 and open the port 33. Then, the grease or other liquid being forced up thru the inlet 7ª, it will flow up thru the tube 3, chamber 4ª and port 30 into the upper end of cylinder 1. This forces the piston 1ª down, and the grease below the piston is forced out thru the port 33, chamber 6ª, tube 2 and outlet 5 to the point of delivery. When the piston reaches the limit of its stroke, it strikes the pin 12. This turns the rocker and puts one of the springs 22 under tension until finally the tension rocks the shaft 21 and by means of the bell crank lever the valve B at that end of the meter is shifted to close the port 33 and open the port 32. At the same time, the rod connection 8 turns the bell crank lever at the opposite end to shift the valve B, closing the port 30 and opening the port 31. Then, the inlet pressure at the chamber 7 forces the grease thru the port 32 and against the piston 1ª causing the piston to travel to the upper end of the cylinder 1 where it strikes the pin 11 and reverses the valves, and the operation continues to repeat as long as the liquid is forced in, the liquid in the upper part of cylinder 1 being forced out thru the port 31 as the piston rises.

To register the amount delivered, a registering attachment is provided, conveniently at the upper end of the meter. This comprises a disc 26 mounted on the outer end of the rock shaft 21 and carrying a spring pawl 28 which engages a ratchet 25 which is mounted to turn on the shaft 21, and this ratchet 25 carries a pointer 25ª which indicates quantity on a dial 27 surrounding the plate 26. This dial is marked with quantities corresponding to the capacity of the cylinder 1, and whenever the valves are reversed the pawl picks up the ratchet and carries the pointer around to register the quantity delivered.

The valves and pins slide, and the rockers operate, in a bath of grease or other fluid at all times, so they are not apt to stick, and the reversing action is quite quick and positive so that the meter is reasonably accurate, and, as stated, the delivery is continuous during the operation of the device.

The invention is not limited to the particular mechanism shown and described, but various modifications may be made within the scope thereof.

I claim:

1. In a meter, the combination of a cylinder having inlet and outlet ports at each end, an inlet passage communicating with the inlet ports, an outlet passage communicating with the outlet ports, and a floating piston in the cylinder, a slide valve at each end of the cylinder, operating transversely of the cylinder to open and close said ports, an operating mechanism for said valves, including a pin projecting into each end of the cylinder and adapted to be struck by the piston, bell cranks at opposite ends of the cylinder and engaging the valves respectively, means connecting said bell crank to operate the same simultaneously and yielding connections between the pins and the bell cranks.

2. In a meter, the combination of a cylinder having an inlet port and an outlet port at each end, a valve at each end controlling said ports, a floating piston in the cylinder, and means to operate said valves, including a strike pin at each end of the cylinder, a rocker to which said pin is operatively connected, a bell crank lever one arm of which is connected to the valve, a spring connection between the rocker and the bell crank lever, and a connection between the bell cranks at the respective ends of the cylinder, whereby the valves are simultaneously operated.

In testimony whereof I affix my signature.

ELON A. ORMSBY.